No. 871,499. PATENTED NOV. 19, 1907.
D. H. & G. S. GRAY.
COAL WASHER.
APPLICATION FILED JUNE 25, 1907.

2 SHEETS—SHEET 1.

WITNESSES:
Samuel Payne
N. H. Butler

INVENTORS
D. H. Gray
G. S. Gray
By H. C. Everitt Co.
Attorneys

No. 871,499. PATENTED NOV. 19, 1907.
D. H. & G. S. GRAY.
COAL WASHER.
APPLICATION FILED JUNE 25, 1907.

2 SHEETS—SHEET 2.

WITNESSES:
Samuel Payne.
K. H. Butler.

INVENTORS
D. H. Gray.
G. S. Gray.
By H. C. Evert & Co.
Attorneys

UNITED STATES PATENT OFFICE.

DANIEL H. GRAY AND GEORGE S. GRAY, OF DUNBAR, PENNSYLVANIA.

COAL-WASHER.

No. 871,499.  Specification of Letters Patent.  Patented Nov. 19, 1907.

Application filed June 25, 1907. Serial No. 380,775.

*To all whom it may concern:*

Be it known that we, DANIEL H. GRAY and GEORGE S. GRAY, citizens of the United States of America, residing at Dunbar, in the county of Fayette and State of Pennsylvania, have invented certain new and useful Improvements in Coal-Washers, of which the following is a specification, reference being had therein to the accompanying drawing.

This invention relates to coal washers, of the class in which a vertically reciprocating jig is employed to shake or agitate the coal and cause the slate or other impurities contained therein, to gravitate to the bottom of the jig.

The primary object of the present improvement is to provide novel means for effecting the vertical reciprocation of the jig, and to combine therewith vertically disposed springs to permit the jig to drop below the limit of its normal downward movement, when said jig is sufficiently weighted by slate therein, such dropping of the jig serving to automatically open a gate or valve for the discharge of the slate.

The construction of the improvement will be fully described hereinafter, in connection with the accompanying drawing, which constitutes a part of this specification, and its novel features will be defined in the appended claims.

Figure 1:
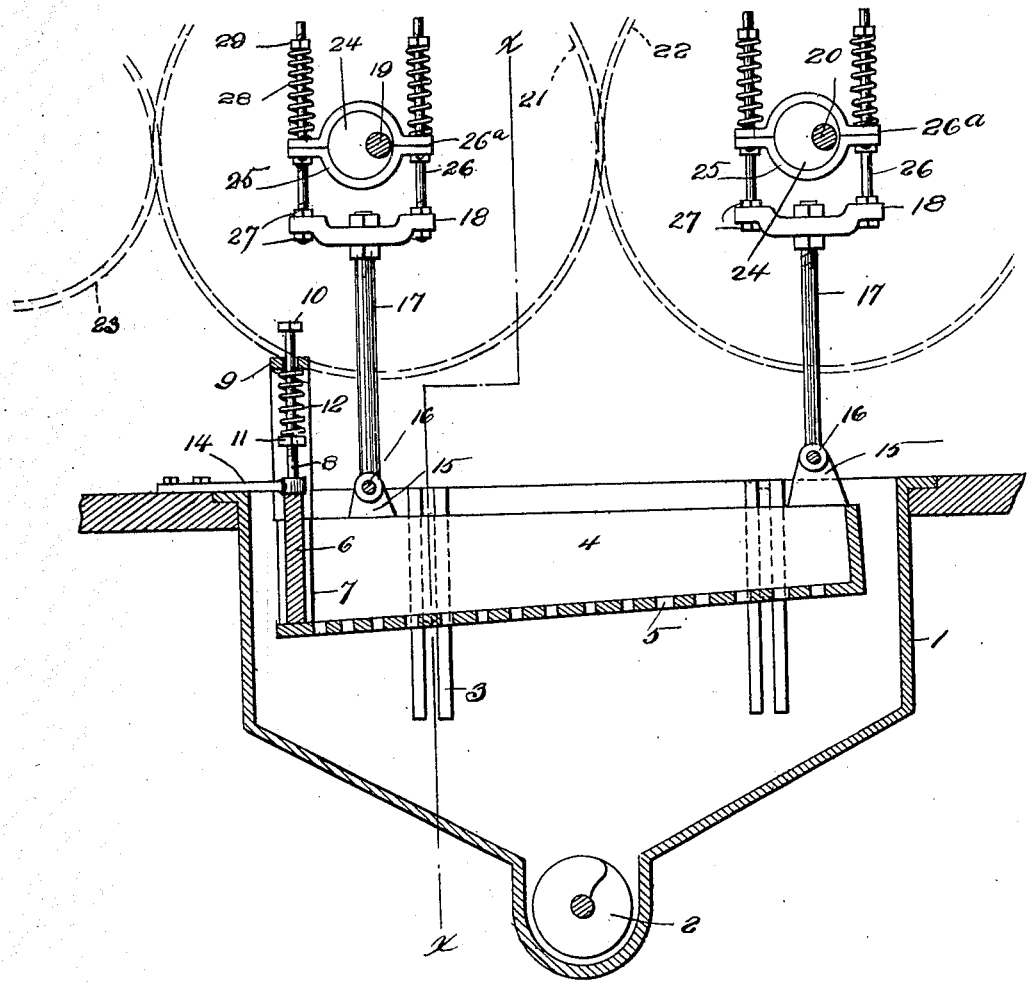
Figure 2:
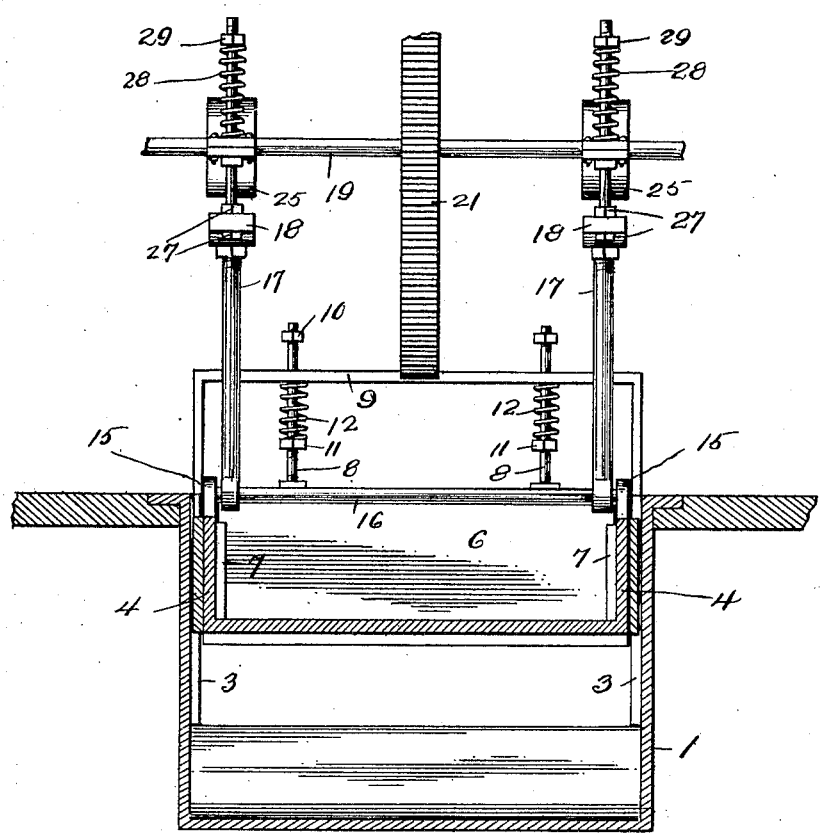

In the drawing:—Figure 1 is an elevation of a coal-washer jig partly in section, and Fig. 2 is a cross sectional view taken on the line *x*—*x* of Fig. 1.

The reference numeral 1 designates a conventional form of tank having a conveyer 2 located in its bottom. The sides of the tank are provided with guide-ways 3 for a washer jig 4, said jig having a perforated bottom 5 and a gate or valve 6, which is slidably mounted in guide-way 7 carried by the washer jig. The valve or gate 6 is normally supported by the perforated bottom of the jig, but is limited in its movement by upwardly extending threaded rods 8, said rods passing through a cross head 9 supported by the washer jig, at one end thereof. The upper ends of the rods 8 are provided with heads 10 adapted to impinge the cross head 9 and limit the downward movement of the gate or valve 6. Threaded upon the rods 8 are nuts 11 and interposed between said nuts and the cross head 9 are coiled springs 12, for cushioning the upward movement of the gate or valve 6. An extreme upward movement of said gate or valve is limited by brackets 14 through which the rods 8 extend, said brackets being carried at the end of the tank 1.

The upper edges of the washer jig are provided with bearings 15 arranged in pairs, there being two of said bearings at each side of the tank alining with two other similar bearings at the opposite side of the tank. These bearings are for transverse shafts 16, and secured to said shafts near the ends thereof, are vertical rods 17, each carrying at its upper end a cross head 18.

The numerals 19 and 20 designate parallel shafts which are revolved by intermeshing gears 21 and 22 driven by a spur wheel or gear 23 from any suitable source of power. The gear wheels are conventionally indicated by dotted lines in Fig. 1, and one of said gear wheels is shown in full lines in Fig. 2.

Upon each end of each of the shafts 19 and 20 is mounted an eccentric 24, encompassed by two oppositely disposed straps 25 having oppositely projecting lugs 26ª formed with openings alining with openings formed in the ends of the cross heads, for the passage of vertical rods 26. These rods are held in position by nuts 27, and surrounding each of said rods above the upper eccentric straps, is a coiled spring 28, the upper end of which is confined by nut 29, and the lower end by the adjacent eccentric strap.

The normal up and down movement of the jig is caused by the revolution of the eccentrics within their straps, the springs 16 serving no function, but, when by reason of the accumulation of slate in the bottom of the jig, the weight of the jig is sufficient to compress the springs 16, and the jig will, on its downward movement, drop below its normal limit of travel, and such additional downward movement serves to allow the slate to pass beneath the gate or valve 6 now supported by the brackets 14.

What we claim is:

1. In a coal-washer, the combination with a jig, of a gate normally supported by said jig, a cross head for guiding said gate and supporting said gate when said jig is lowered, means for cushioning the upward movement of said gate, means for reciprocating said jig, comprising revoluble shafts, eccentrics mounted thereon, and provided with oppositely projecting arms, rods extending through said arms, cross heads secured to the lower ends of said rods, rods suspended from said cross heads, coiled springs surrounding the rods which extend through said arms, the ends of said springs being confined as described.

2. In a coal-washer, the combination with a jig and a washer carried thereby, of a gate supported in said washer, means for limiting the downward movement of said gate, means for reciprocating said jig, and for automatically opening said gate, said means consisting of rods connecting with said washer, cross heads carried by said rods, upwardly extending rods carried by said cross heads, spring pressed eccentric straps carried by said upwardly extending rods, and eccentrics for raising and lowering said straps.

3. In a coal-washer, the combination with a jig, and a gate normally carried thereby, of revoluble shafts, eccentrics mounted upon said shafts, connections between said eccentrics and said jig, yielding devices for permitting the jig to drop below its normal limit of downward movement to open said gate, and yielding devices for closing said gate, when the jig is raised.

4. In a coal washer, the combination with a tank and conveyer mounted therein, of a jig suspended within the tank, a gate normally carried thereby, rotatable shafts arranged above the tank, eccentrics carried by said shafts, connections between said eccentrics and said jigs, yielding devices for permitting the jig to drop below the normal limit of its downward movement to open said gate, and yielding devices for closing said gate when the jig is raised.

5. In a coal washer, the combination with a tank and a conveyer mounted therein, a jig suspended within the tank, a gate normally carried thereby, rotatable shafts arranged above the tank, eccentrics carried by said shafts, connections between said eccentrics and said jigs, yielding devices for permitting the jig to drop below the normal limit of its downward movement to open said gate, yielding devices for closing said gate when the jig is raised, and means carried by the tank for limiting the upward movement of the gate.

6. In a coal washer, the combination with a tank, of a jig suspended therein, guides for the jig, said guides carried by the tank, a gate normally carried by the jig, rotatable shafts arranged above the tank, eccentrics mounted upon said shafts, connections between said eccentrics and said jigs, yielding devices permitting the jig to drop below its normal limit of downward movement to open said gate, and yielding devices for closing said gate when the jig is raised.

In testimony whereof we affix our signature in the presence of two witnesses.

DANIEL H. GRAY.
GEORGE S. GRAY.

Witnesses:
  MAX H. SROLOVITZ,
  A. J. TRIGG.